(12) United States Patent
Warden

(10) Patent No.: US 7,314,237 B2
(45) Date of Patent: Jan. 1, 2008

(54) PIPE JOINT ASSEMBLY

(76) Inventor: Charles M. Warden, 307 Main, Towanda, KS (US) 67144

( * ) Notice: Subject to any disclaimer, the term of this patent is extended or adjusted under 35 U.S.C. 154(b) by 187 days.

(21) Appl. No.: 10/857,677

(22) Filed: May 28, 2004

(65) Prior Publication Data

US 2005/0264003 A1    Dec. 1, 2005

(51) Int. Cl.
*F16L 35/00* (2006.01)
*G01F 23/02* (2006.01)
*G01F 15/04* (2006.01)

(52) U.S. Cl. .......................... 285/93; 116/276; 73/323; 73/325

(58) Field of Classification Search .................. 285/93, 285/392; 73/323, 325, 334; 116/276
See application file for complete search history.

(56) References Cited

U.S. PATENT DOCUMENTS

| | | | | |
|---|---|---|---|---|
| 820,922 A * | 5/1906 | Einsele | ......................... | 184/96 |
| 1,172,039 A * | 2/1916 | Ottesen | ....................... | 184/96 |
| 1,417,530 A * | 5/1922 | Kendall et al. | ............. | 73/54.16 |
| 1,483,200 A * | 2/1924 | Skold | ....................... | 73/861.54 |
| 1,694,903 A * | 12/1928 | Anderson | ................... | 116/276 |
| 1,694,904 A * | 12/1928 | Anderson | ................... | 116/276 |
| 1,886,444 A * | 11/1932 | Wurster | ....................... | 116/276 |
| 2,570,322 A * | 10/1951 | Christopher | ................ | 137/559 |
| 2,592,848 A * | 4/1952 | Baird | .......................... | 138/37 |
| 2,620,663 A * | 12/1952 | Fine | .............................. | 73/325 |
| 2,624,308 A * | 1/1953 | Wittlin | ........................ | 116/276 |
| 2,655,124 A * | 10/1953 | Gary et al. | .................. | 116/276 |
| 2,660,144 A * | 11/1953 | Newcum | ..................... | 116/275 |
| 2,687,108 A * | 8/1954 | Walker | ........................ | 116/276 |
| 2,714,868 A * | 8/1955 | Franck | ........................ | 116/276 |
| 2,725,844 A * | 12/1955 | Wittlin | ........................ | 116/276 |
| 2,744,488 A * | 5/1956 | Wittlin | ........................ | 116/276 |
| 2,817,309 A * | 12/1957 | Wittlin | ........................ | 116/276 |
| 2,842,089 A * | 7/1958 | Midkiff | ....................... | 116/276 |
| 2,843,078 A * | 7/1958 | Wittlin | ........................ | 116/276 |
| 3,375,802 A * | 4/1968 | Lazarre | ....................... | 116/276 |
| 3,585,963 A * | 6/1971 | Hiszpanski | .................. | 116/206 |
| 5,628,231 A * | 5/1997 | Sheridan | ....................... | 73/323 |
| 5,673,722 A * | 10/1997 | Brass | ........................ | 137/15.01 |
| 2003/0047128 A1* | 3/2003 | Delp | ........................... | 116/276 |

* cited by examiner

*Primary Examiner*—James M. Hewitt
(74) *Attorney, Agent, or Firm*—Kenneth H. Jack; Davis & Jack, L.L.C.

(57) ABSTRACT

A pipe joint assembly including a transparent quill; an outer quill having at least a first view port, and having at least a first outwardly extending pipe coupling thread which extends longitudinally along and helically about the outer quill, the transparent quill being slidably received by the outer quill; a pair of baffles; and baffle mounting helical threads interconnecting the baffles and the outer quill, the baffle mounting helical threads positioning the baffle so that they extend radially inward from the outer quill, the baffle mounting helical threads further positioning the baffles for resisting longitudinal sliding and counter-sliding motions of the transparent quill.

8 Claims, 6 Drawing Sheets

PIPE JOINT ASSEMBLY

FIELD OF THE INVENTION

This invention relates to the liquid carrying pipes, tubes, and conduits. More particularly, this invention relates to such structures which are adapted or modified for safely carrying volatile or flammable liquids.

BACKGROUND OF THE INVENTION

Joints of pipe which are intended to be used for conveying flammable liquids such as gasoline are commonly configured as a hollow bored tube having pipe coupling means integral with or formed wholly with opposite ends of the tube. For example, opposite ends of a pipe joint may incorporate outwardly extending helical threads for coupling with other similarly configured pipe joints in the formation of a pipe string. Where such threads are present at opposite ends of a pipe joint, pipe coupling typically is accomplished via internally threaded coupling sleeves. As a further example, one end of such pipe joint may incorporate an outwardly extending helical thread, while the opposite end of the joint may include a wholly formed internally threaded bell, such pipe coupling structures allowing multiple identical renditions of such pipe joint to be threadedly attached end to end, forming a liquids conveying pipe string. As further examples, ends of such pipe joints may alternately incorporate longitudinally apertured mounting flanges or radially outwardly extending ridges which are adapted for engaging with and being drawn longitudinally by rotatable coupling nuts.

When such pipe joints are interconnected to form a pipe string for conveyance of flammable liquids, it is often desirable to incorporate within the pipe string means for determining the presence and/or the character of liquids within the bores of the pipe joints. For example, where a pipe string is to be disassembled, the bores of the joints are preferably devoid of flammable liquids. Disassembly of a pipe string which contains a flammable liquid such as gasoline can result in a hazardous chemical spill, or may result in a fire or explosion. Accordingly, operators are desirably provided means for confirming the absence of gasoline within such a pipe string prior to disassembly. Such confirmation is similarly desirable where such a pipe string extends from a tank and is utilized for purging water which on occasion may underlie gasoline within the tank. In that setting, an operator is desirably provided means for detecting the commencement of gasoline flow into pipe string, allowing a shut off valve to be immediately closed upon completion of water purging, and avoiding undesirable filling of the pipe string with gasoline.

The instant inventive pipe joint assembly provides a means for visually confirming the presence or character of liquids within a pipe string as described above, while also providing for mechanical simplicity and economy; the assembly being capable of performing all of the functions of commonly configured pipe joints among a pipe string, and the assembly being installable and disassembleable as easily as such commonly configured pipe joints.

BRIEF SUMMARY OF THE INVENTION

A structural component of the instant inventive pipe joint assembly comprises a transparent tube or quill, which is preferably approximately eight inches in length. Preferably, the transparent quill is composed of chemical resistant polyvinyl-chloride plastic (PVC). Suitably, the transparent quill may comprise transparent acrylic plastic or may comprise glass.

The outside diameter of the transparent quill is preferably selected in accordance with the size or gauge of the pipes among the pipe string into which the inventive pipe joint assembly is to be installed. For example, where the inside diameters of the pipes are 3½ inches, the outside diameter of the transparent quill is preferably, for reasons explained below, slightly greater than 3½ inches.

A further structural component of the instant inventive pipe joint assembly comprises an outer quill which is preferably fabricated of a short length of steel pipe which preferably matches the gauge of the joints of an exemplary pipe string. Preferably, the bore of such outer quill is closely fitted via longitudinal rotary milling for sliding receipt of the transparent quill. The close fit assists in preventing seepage of fluids between the outer and transparent quills. Such close fit also advantageously forestalls material fatigue within the transparent quill by preventing radial expansions and contractions of the transparent quill which may otherwise occur in response to cycles of pressurization and decompression.

Assuming that the transparent quill is eight inches in length as set forth above, the outer quill preferably has a length of 9½ inches to 10 inches, allowing ends of the outer quill to extend longitudinally outward beyond the longitudinal ends of the transparent quill.

In order to allow an operator to visually confirm the presence or character of liquids flowing through the concentric bores of the outer and transparent quills, at least a first view port necessarily extends through the wall of the outer quill, such port necessarily being longitudinally positioned at a medial point which overlies the transparent quill. Preferably, a triple of such view ports extending through the wall of the outer quill is provided, the three ports preferably being radially arranged about the outer quill's annular periphery at "on center" intervals of approximately 120°. By arranging the preferred triple of view ports at 120° intervals, at least one view port will always appropriately correspond with the angle of an operator's line of sight, while another one of such view ports will be advantageously angled for entry of daylight or torch light for illuminating liquids within the bore of inventive pipe joint assembly. Preferably, for reasons explained below, each of the view ports is longitudinally oblongated.

Pipe coupling means in the form of radially outward and helically extending pipe threads are preferably cut or cast within the outer peripheral surface of the outer quill at least at one of the outer quill's ends. Suitably, the opposite end of the outer quill may comprise a similarly configured outwardly extending helical thread. Alternately, such opposite end may incorporate wholly formed structures such as an internally threaded coupling bell, a radially outwardly extending rotatable coupling nut engaging ridge, or a mounting flange having longitudinally extending bolt receiving apertures. The pipe coupling means may also alternately comprise threadedly mounted lever actuated "cam and channel" quick disconnect joints. By configuring the outer quill of the inventive pipe joint assembly to incorporate common pipe coupling means at its opposite ends, such assembly may be mounted within and as a part of a pipe string as easily as any other common joint of such pipe string. Mechanical simplicity and economy is promoted by such configuration, facilitating the use of tools and assembly steps which are common to the maintenance, assembly, and disassembly of such pipe strings.

Further structural elements of the instant inventive pipe joint assembly comprise a pair of baffles and baffle mounting means, the baffle mounting means interconnecting the baffles so that they extend radially inwardly from the outer quill, and so that the baffles are positioned longitudinally outwardly from the ends of the transparent quill. Such longitudinal positioning of the baffles advantageously resists longitudinal sliding and counter-sliding motions of the transparent quill with respect to the outer quill. As a liquid such as gasoline flows through the bore of the pipe joint assembly, a portion of the gasoline initially impinges upon one of the baffle's longitudinally outwardly oriented faces, resulting in coalescence of gas bubbles and causing turbulence or swirling of such bubbles as they proceed through the bore of the pipe joint assembly. The preferred longitudinal oblongation of the view ports extending through the outer quill assists an operator in viewing and visually detecting such bubbles as they traverse the bore of the pipe joint assembly. The baffles' creation of swirling gas bubbles within such liquid gasoline in combination with the oblongation of the view ports, and in further combination with the above described radial orientation of the preferred triple of view ports for entry of light and matching of line of sight, assists an operator in visually determining the presence and flow of liquids within the bore of the pipe joint assembly.

Each of the baffles is preferably configured as a ring whose outside diameter is closely fitted receipt within the inside diameter of the outer quill. Also preferably, the baffles comprise steel. Suitably, the baffles may alternately comprise PVC plastic.

A preferred baffle mounting means comprises inter-meshing radially outwardly extending and radially inwardly extending helical threads, the radially inwardly extending helical threads extending from the outer quill, and the radially outwardly extending helical threads extending from the baffles. Utilization of such inter-meshing helical thread baffle mounting means advantageously facilitates longitudinal adjustment of the positions of the baffles, and allows the baffles to opposingly compress or clamp the transparent quill in place within the bore of the outer quill.

Suitably, the baffle mounting means may comprise a combination of helical threading at a first end of the transparent quill, and rigid or fixed attaching means such as welds, glued attachments, wholly formed attachments, or riveted, bolted, or screwed attachments, such attachments immovably mounting the opposite baffle at the other end of the transparent quill. Suitably, though undesirably, the baffle mounting means may rigidly and immovably attach the baffles to the outer quill at opposite end of transparent quill. Where the baffle mounting means advantageously comprises inter-meshing helical threads at at least one end of the transparent quill, disassembly of the pipe joint assembly for replacement of the transparent quill is facilitated. Use of threads at at least one end of the transparent quill also advantageously facilitates compressive holding of the transparent quill.

Further preferred structural elements of the instant inventive pipe joint assembly comprise a pair of sealing quills. Preferably, the sealing quills have outside diameters closely fitted to the inside diameter of the transparent quill, and preferably the sealing quills are fixedly attached to or are formed wholly with the baffles, the sealing quills extending longitudinally inwardly from the baffles. Also preferably, distal or longitudinally inwardly extending ends of the sealing quills are radially inwardly chamfered for deflection of flowing liquids toward the center of the bore of the pipe joint assembly and away from the inner surface of the transparent quill, such deflection assisting in preventing liquids from flowing between the outer surface of the transparent quill and the inner surface of the outer quill.

Further preferred structural components of the instant inventive pipe joint assembly comprise a pair of elastomeric fluid sealing "O" rings which are preferably disposed between the longitudinally outer faces of the transparent quill and the longitudinally inner faces of the baffles. Such "O" ring positioning advantageously allows the compression of the baffles as described above to compress the "O" rings, forming hermetic seals between the baffles and the transparent quill. The combined functions of the close fitting of the outside diameter of the transparent quill to the inside diameter of the outer quill, the close fitting of the outside diameters of the sealing quills to the inside diameter of the transparent quill, the chamfering of the distal ends of the sealing quills, and the "O" ring compression, assists in hermetically sealing the pipe joint assembly. Preferably, a longitudinal hermetic seal along the pipe joint assembly is completed upon sealing of any seam between the chosen baffle mounting means and the outer quill, and upon sealing of couplings which connect the inventive pipe joint assembly with other segments of a pipe string.

Accordingly, objects of the instant invention include the provision of a pipe joint assembly which is adapted for mounting within, and alternate disassembly from, a pipe string in a manner common to pipe string construction, which is capable of conveying liquids in a manner common to pipe segments among a pipe string, and which is further capable of facilitating visual confirmations of the presence or character of liquids within the bore of such pipe string.

Other and further objects, benefits, and advantages of the instant invention have been described above, and are further described in the Detailed Description and appended drawings which follow.

DETAILED DESCRIPTION OF A PREFERRED EMBODIMENT

Figure 1:
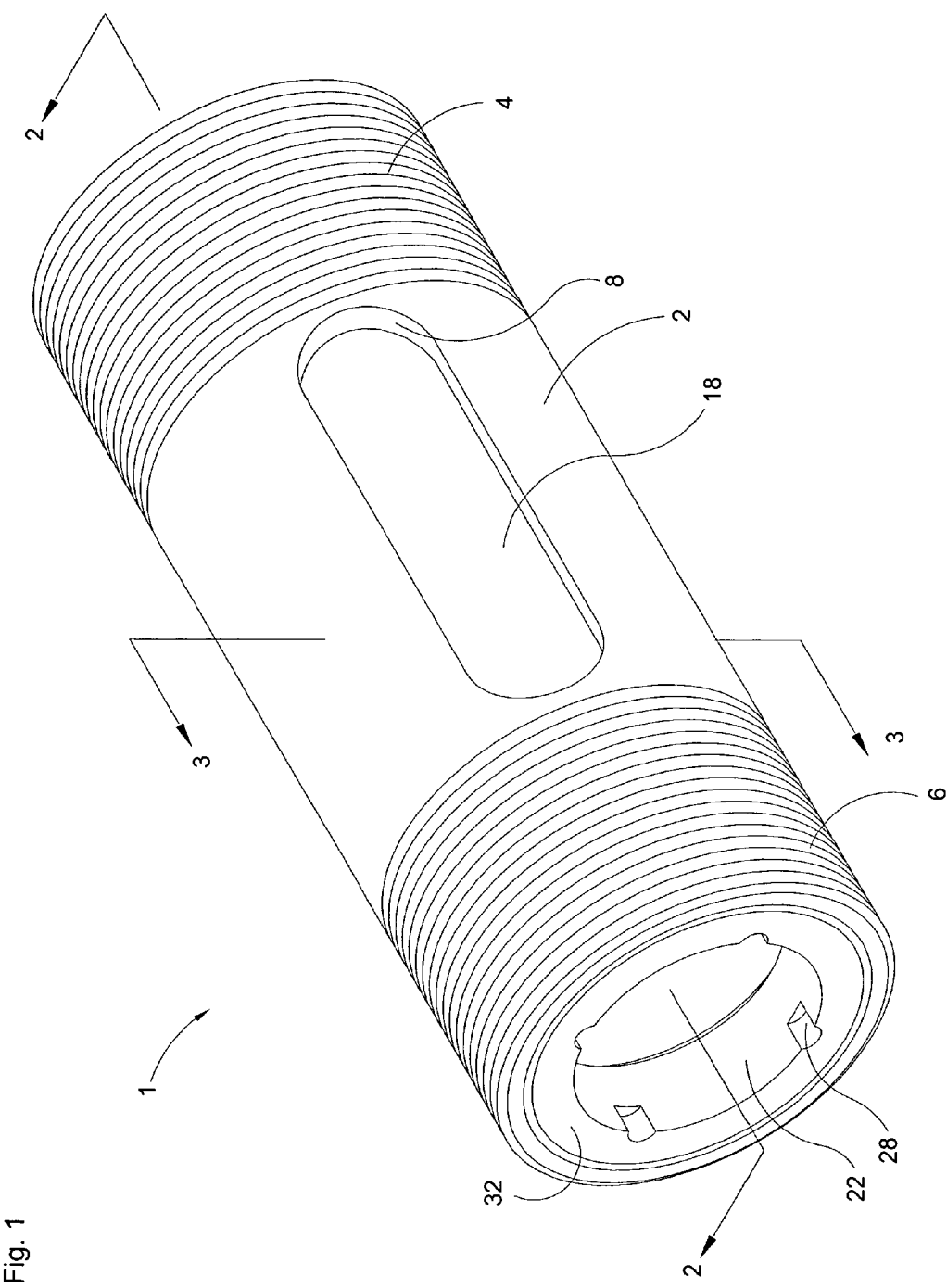
FIG. 1 is an isometric view of a preferred embodiment of the instant inventive pipe joint assembly.
Figure 3:
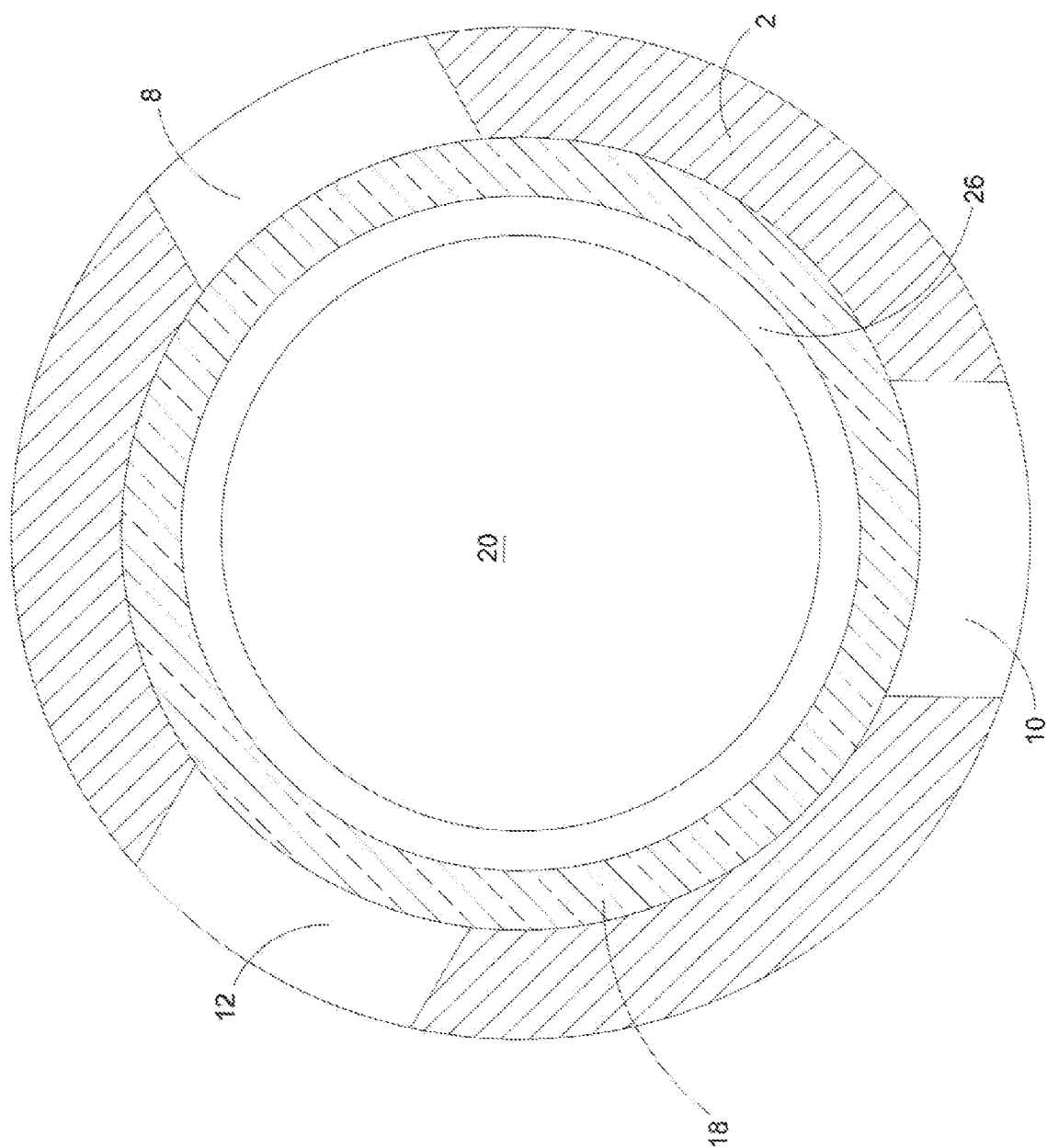
FIG. 3 is an alternate sectional view as indicated in FIG. 1.

Referring now to the drawings, and in particular to FIG. 1, a preferred embodiment of the instant inventive pipe joint assembly is referred to generally by Reference Arrow 1. The pipe joint assembly 1 comprises an outer quill which preferably comprises a short length of steel pipe. Referring further simultaneously to FIG. 3, the outer quill 2 preferably has longitudinally oblongated view ports 8, 10, and 12 which are preferably radially oriented about the outer quill 2 at 120° intervals, such orientations facilitating entry of light and lines of sight.

Figure 4:
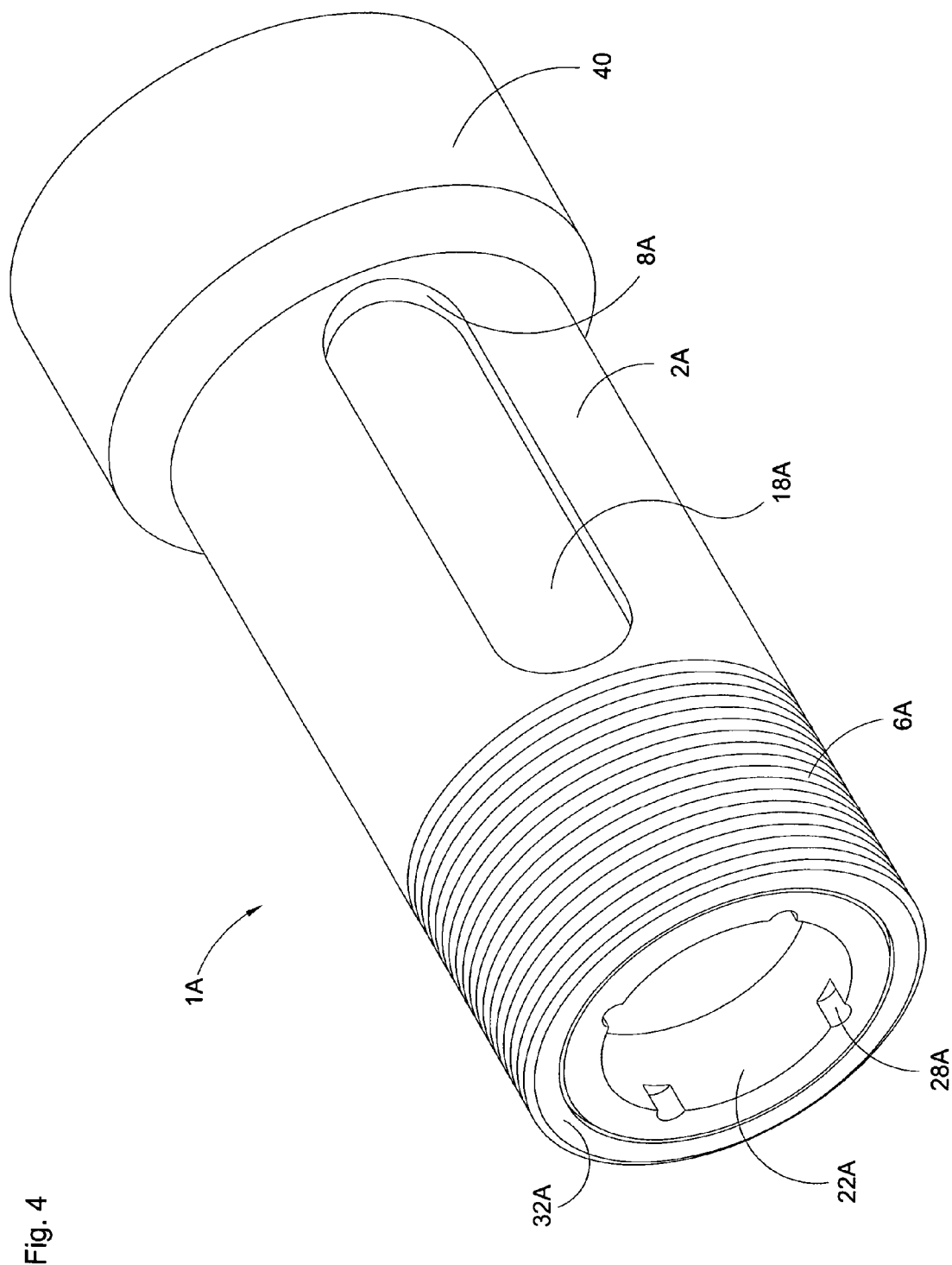
FIG. 4 redepicts FIG. 1, showing the pipe joint assembly alternately incorporating belled pipe coupling means.
Figure 5:
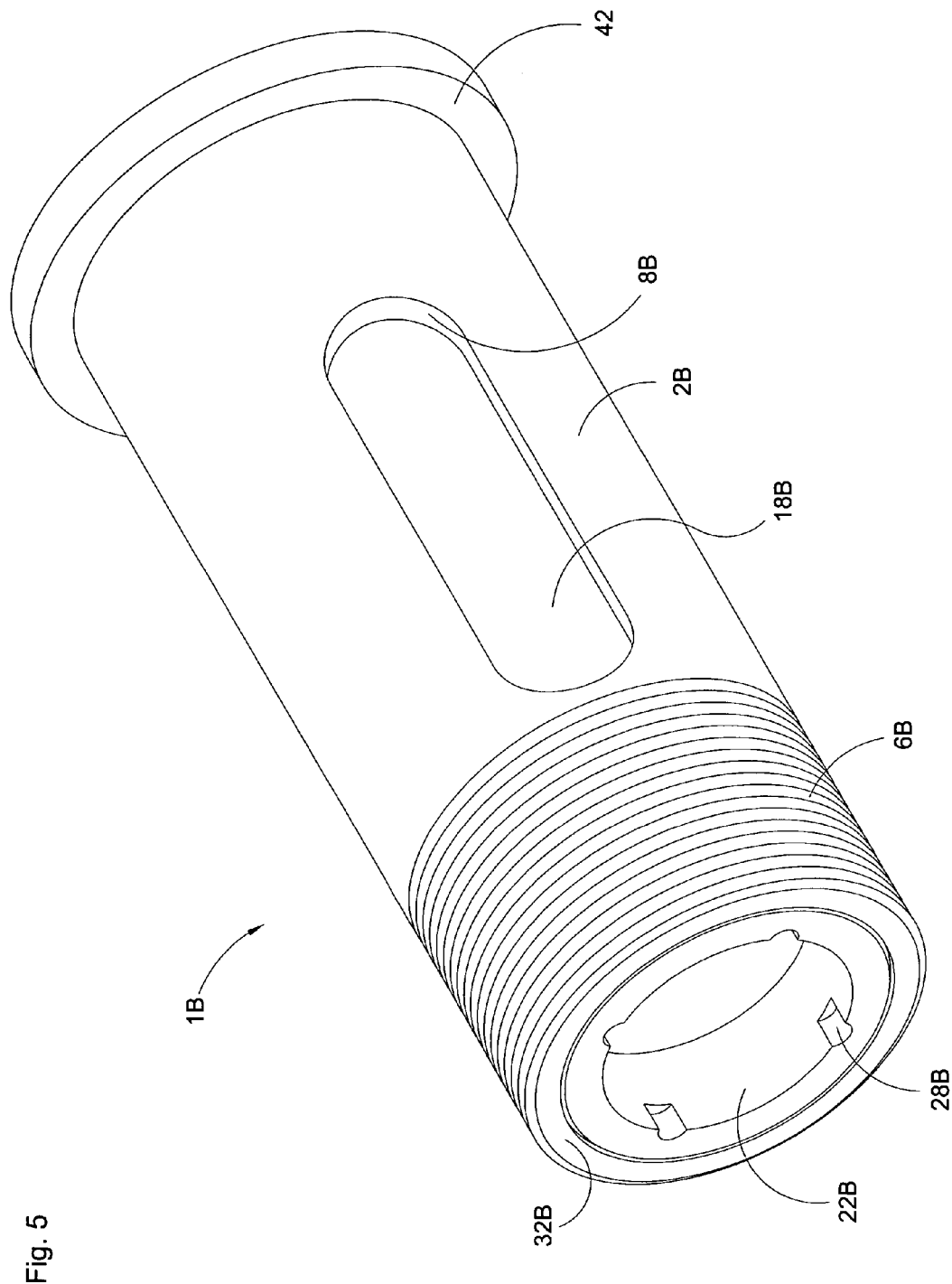
FIG. 5 alternately redepicts FIG. 1, showing the pipe joint assembly incorporating a rotatable coupling nut engaging flange pipe coupling means.
Figure 6:
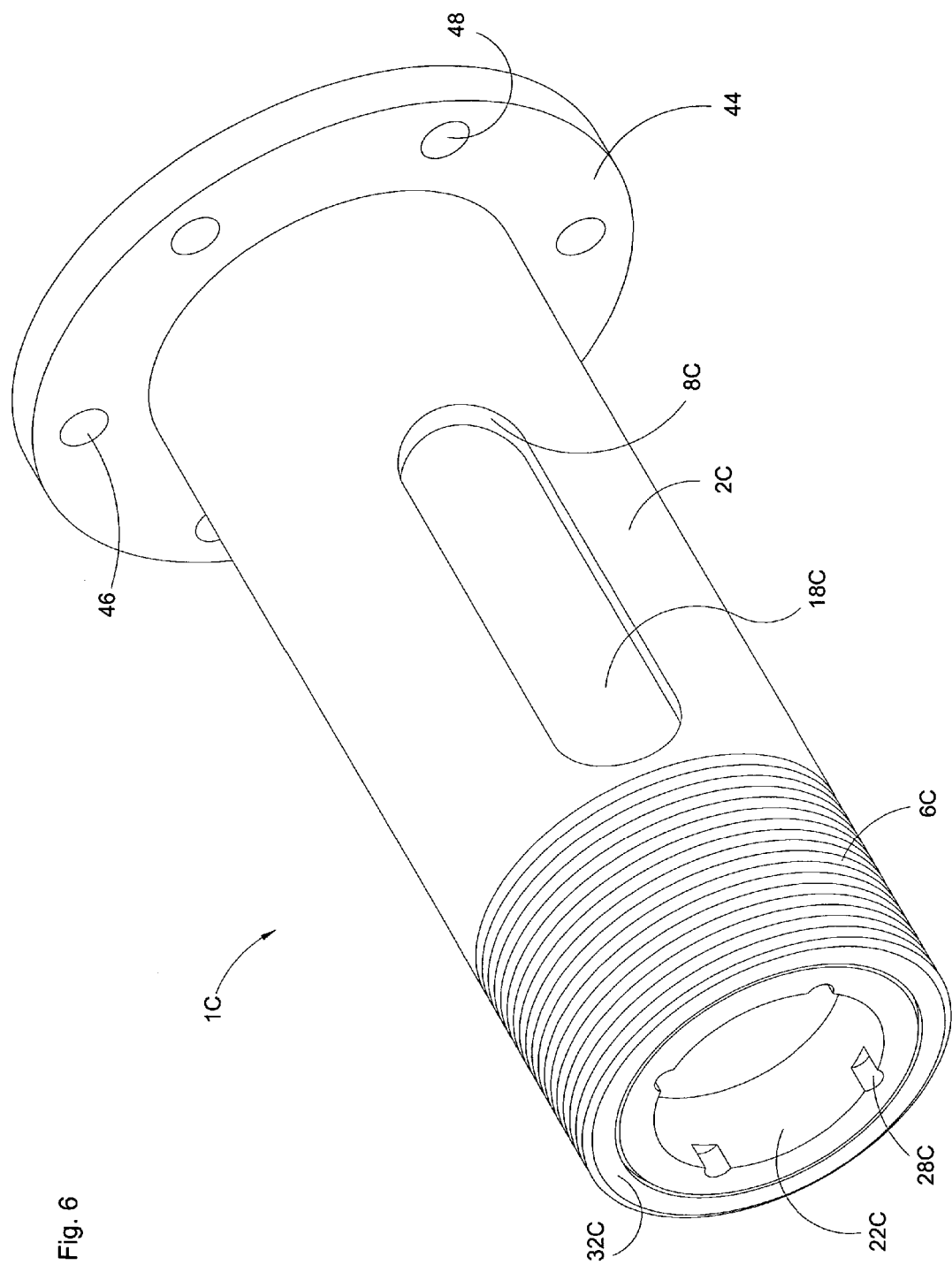
FIG. 6 further alternately redepicts FIG. 1, showing the pipe joint assembly incorporating an apertured flange pipe coupling means.

Referring further to FIG. 1, opposite ends of the outer quill 2 preferably incorporate pipe coupling means such as radially outwardly extending helical threads 4 and 6. Referring further simultaneously to FIGS. 4, 5, and 6, structures identified by reference numerals followed by the suffix "A", "B", or "C" are similar to similarly numbered structures appearing in FIG. 1. FIG. 4 depicts a suitable alternate pipe coupling means comprising an internally threaded bell 40. FIG. 5 depicts a further suitable alternate pipe rotatable coupling means comprising an annular ridge 42 for retaining a rotatable coupling nut (not depicted). FIG. 6 depicts a further alternate coupling means comprising a mounting flange 44 having bolt receiving apertures 46 and 48. The described and depicted pipe coupling means are commonly used in joining of segments of pipe strings, promoting mechanical simplicity and convenience in the use of the pipe joint assembly 1.

Figure 2:
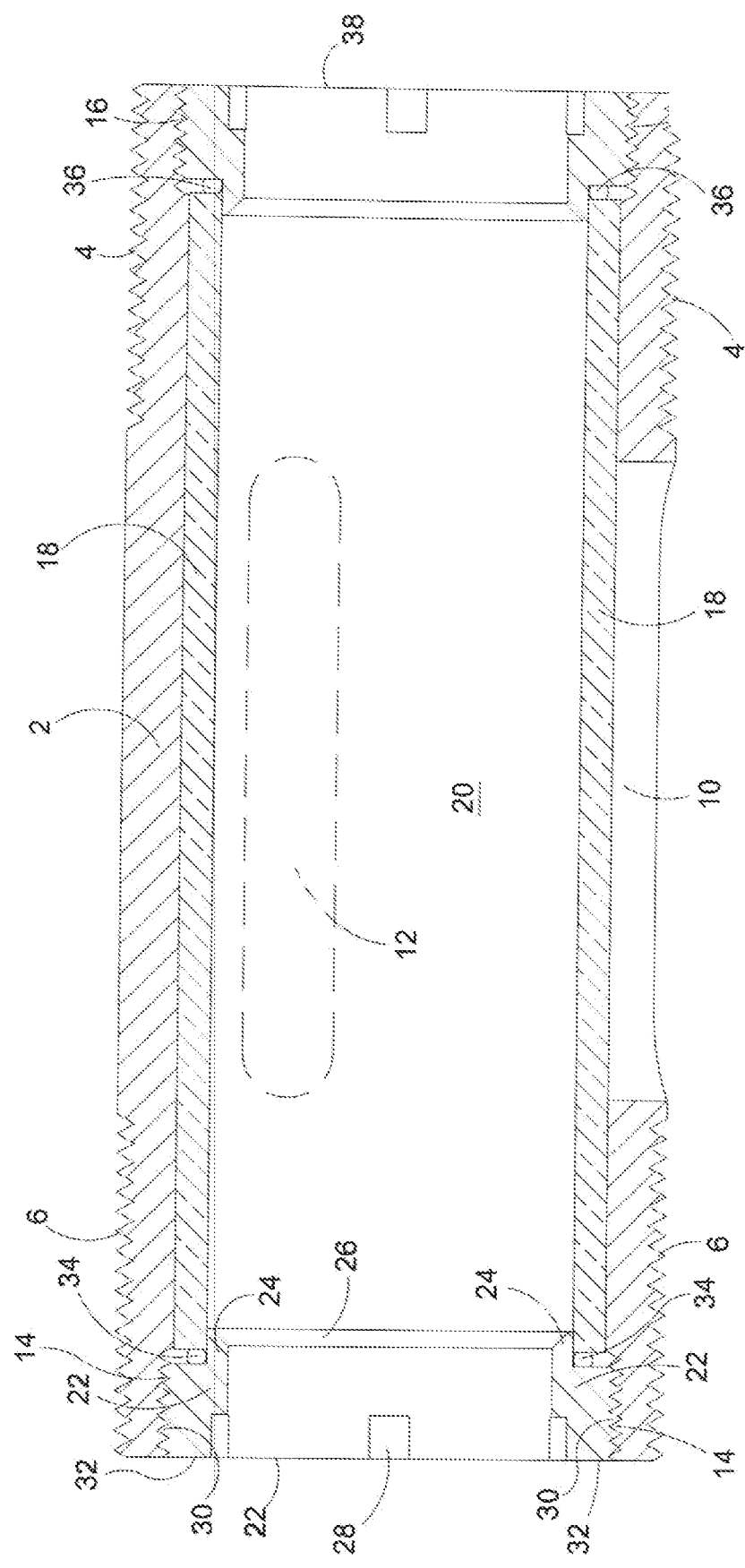
FIG. 2 is a sectional view as indicated in FIG. 1.

Referring simultaneously to FIGS. 1 and 2, the bore of the outer quill 2 is preferably closely fitted by longitudinal rotary milling for sliding receipt of a transparent PVC tube or quill 18. Milling of the outer quill 2 also preferably configures opposite ends of such quill's bore to include radially inwardly extending helical threads 14 and 16.

Referring further simultaneously to FIGS. 1 and 2, a baffle 22, preferably configured as a ring, is mounted within the bore of outer quill 2 by means of outwardly extending helical threads 30, such threads 30 inter-meshing with threads 14. The baffle mounting helical threads 30, by such intermeshing with threads 14, position the baffle 22 so that the baffle 22 extends radially inward from the outer quill. A sealing quill 24 having a beveled or chamfered distal end 26 is preferably formed wholly with the inner end of baffle 22. Preferably, the outside diameter of sealing quill 24 is closely fitted for slidable receipt within the inside diameter of transparent quill 18. Also preferably, baffle 22 includes wrench engaging indentations 28 which facilitate application of rotational torque to baffle 22 for installation and disassembly. A similarly configured baffle 38 is preferably similarly mounted upon threads 16 at the opposite end of the outer and transparent quills 2 and 18. The baffle mounting helical threads of the baffles 22 and 38, in addition to positioning the baffles 22 and 38 for radially inward extensions from the outer quill 2, as discussed above, position the baffles 22 and 28 at opposite ends of the transparent quill 18, for retaining the transparent quill 18 between the baffles 22 and 38 and for resisting longitudinal sliding and counter sliding motions of the transparent quill 18.

Referring to FIG. 2, elastomeric "O" rings 34 and 36 are preferably mounted over the fluid sealing quills 24, creating hermetic seals between baffles 22 and 38, and the ends of the transparent quill 18.

Referring simultaneously to FIGS. 1-3, the instant inventive pipe joint assembly 1 may be disassembled for maintenance or replacement of the transparent quill 18 by engaging a wrench having specialized rotary driver head (not depicted) with indentations 28 of baffle 22, and by rotating baffle 22 counter-clockwise until baffle 22 is threadedly withdrawn from the bore of the outer quill 2, such withdrawal carrying with it "O" ring 34. Upon such longitudinal withdrawal of baffle 22 and "O" ring 34, the transparent quill 18 may be slidably withdrawn from the bore of quill 2, and such quill 18 may be replaced with a similarly configured transparent quill. Reversal of disassembly steps set forth above returns the inventive pipe joint assembly 1 to the configuration depicted in FIGS. 1-3.

In use of the instant inventive pipe joint assembly 1, referring simultaneously to FIGS. 1-6, the pipe joint assembly 1 may, with mechanical simplicity, be installed in the manner of a common segment of a pipe string. As a liquid flows, for example, from left to right with reference to FIG. 2, within the bore 20 of transparent quill 18, a portion of the liquid impinges against the longitudinally outer face 32 of baffle 22. Such impingement causes small and relatively invisible gas bubbles within the liquid to coalesce into larger visible gas bubbles. Such fluid impingement also induces turbulence within the liquid stream, causing such enlarged bubbles to swirl during their passages through the bore 20 of quill 18. An operator viewing such swirling bubbles through any one of the oblongated view ports 8, 12, and 10, is better able to determine that bore 20 is filled with flowing liquid.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A pipe joint assembly comprising:
   (a) a transparent quill;
   (b) an outer quill having a longitudinal outer face, an outer peripheral surface, at least a first view port and at least a first pipe coupling thread extending outwardly from the outer peripheral surface, said thread further extending longitudinally along the outer quill from the longitudinal outer face, and said thread further extending helically about the outer quill, the transparent quill being slidably received by the outer quill;
   (c) a pair of baffles;
   (d) baffle mounting means interconnecting the baffles and the outer quill, the baffle mounting means positioning the baffles so that they extend radially inward from the outer quill, the baffle mounting means further positioning the baffles for resisting longitudinal sliding and counter-sliding motions of the transparent quill;
   wherein the baffle mounting means comprise a plurality of helical threads, each thread among the plurality of helical threads extending radially outward from one of the baffles or extending radially inward from the outer quill; and
   further comprising a pair of fluid sealing quills extending longitudinally inward from the pair of baffles, the fluid sealing quills being slidably received by the transparent quill.

2. The pipe joint assembly of claim 1 further comprising a pair of "O" rings interposed between the baffles and the transparent quill.

3. The pipe joint assembly of claim 2 wherein the outer quill further has a second and a third view port.

4. The pipe joint assembly of claim 3 wherein the at least first, the second, and the third view ports are arranged radially about the outer quill at approximate 120° intervals.

5. The pipe joint assembly of claim 4 wherein each view port is longitudinally oblongated.

6. The pipe joint assembly of claim 5 wherein each of the fluid sealing quills has a chamfered distal end.

7. The pipe joint assembly of claim 6 wherein each baffle comprises wrench engaging means.

8. The pipe joint assembly of claim 7 wherein the outer quill comprises steel, wherein the transparent quill comprises plastic, and wherein each "O" ring comprises an elastomer.

* * * * *